June 22, 1965 E. Y. J. M. GIRE ETAL 3,190,584
FLUID DISTRIBUTION DEVICE ESPECIALLY APPLICABLE TO CONTROL
BY JET OF V.T.O.L. AIRCRAFT
Filed April 21, 1964 7 Sheets-Sheet 3
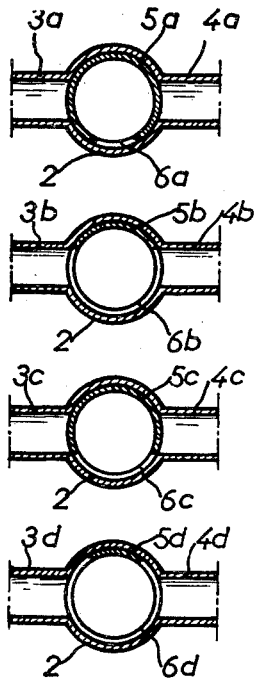
Fig.:6
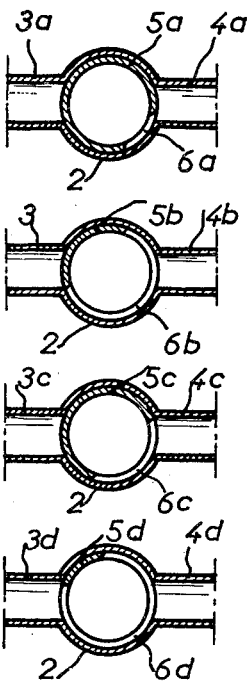
Fig.:6a
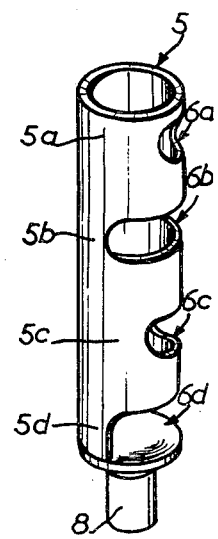
Fig.:8
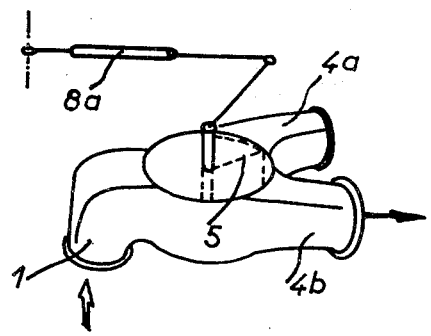
Fig.:21
INVENTORS
Etienne Y. J. M. Gire
August L. Meunier
By Watson, Cole, Grindle & Watson
ATTORNEYS June 22, 1965  E. Y. J. M. GIRE ETAL  3,190,584
FLUID DISTRIBUTION DEVICE ESPECIALLY APPLICABLE TO CONTROL
BY JET OF V.T.O.L. AIRCRAFT
Filed April 21, 1964  7 Sheets-Sheet 4
Fig.: 9
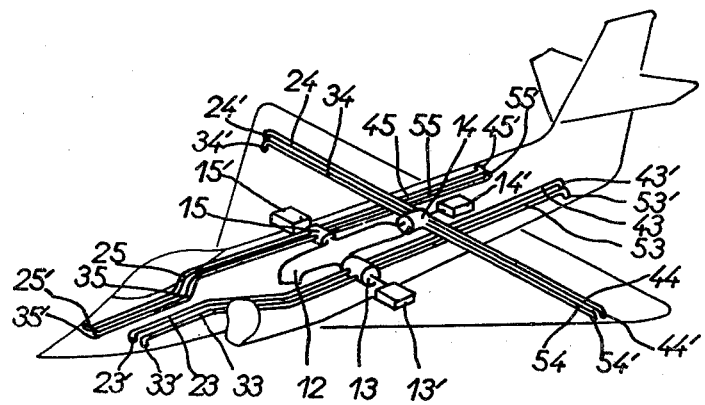
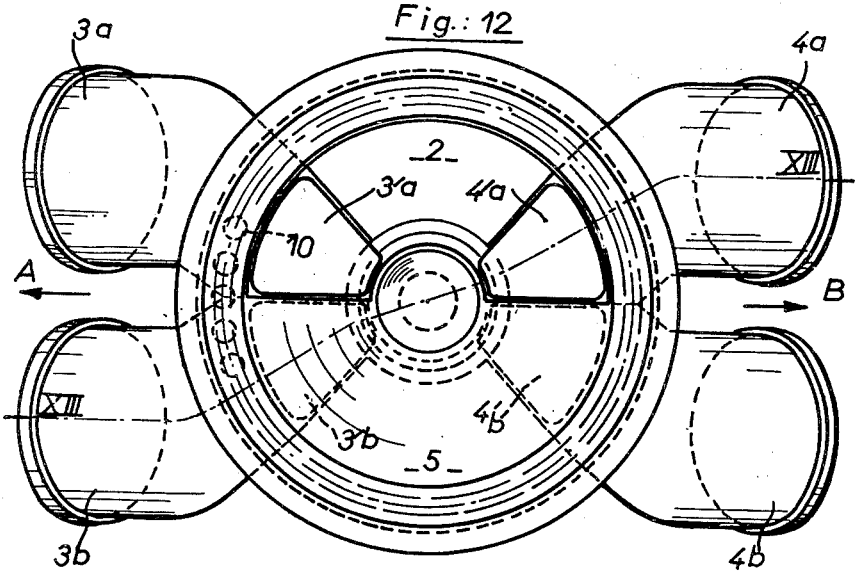
Fig.: 12
INVENTORS
Etienne Y. J. M. Gire
August L. Meunier
By Watson, Cole, Grindle & Watson
ATTORNEYS

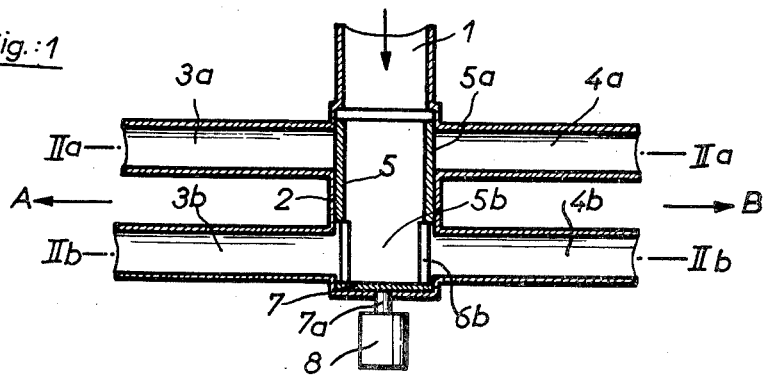
Fig.:1
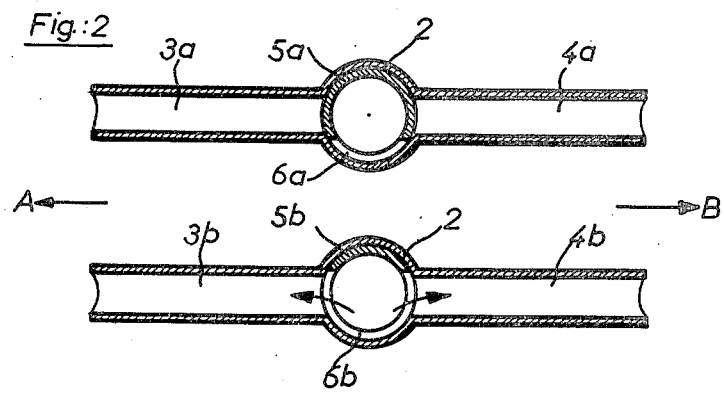
Fig.:2
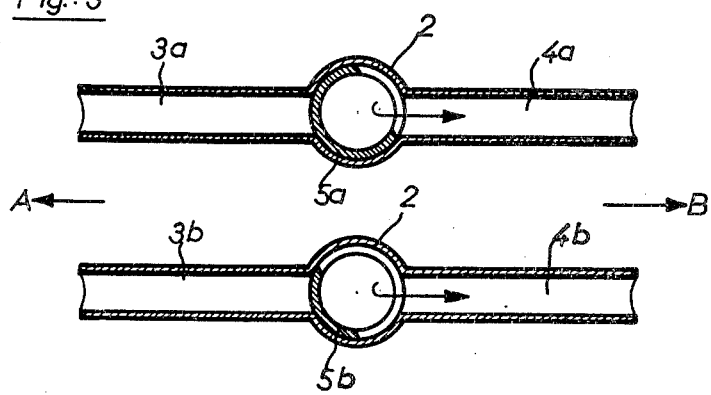
Fig.:3

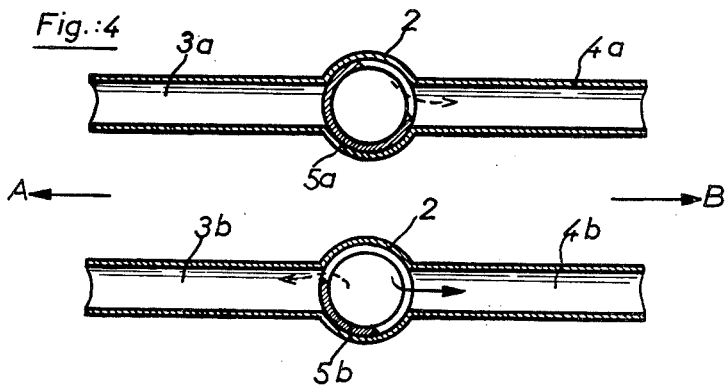
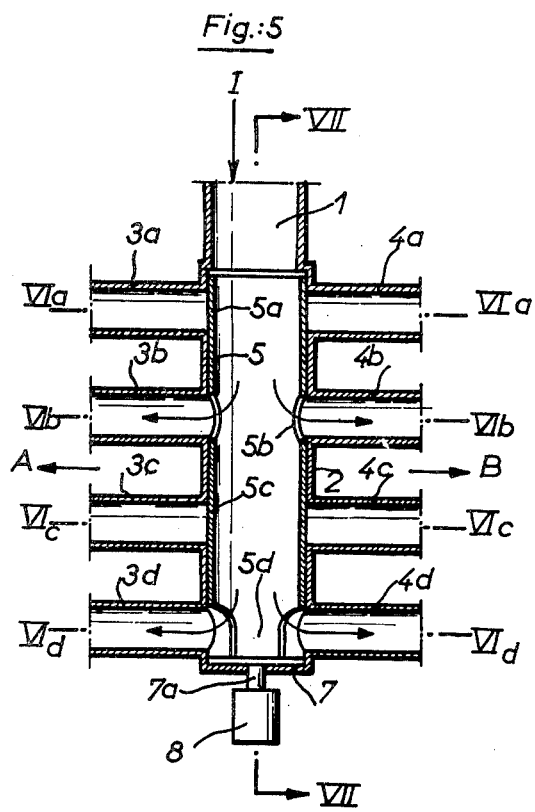
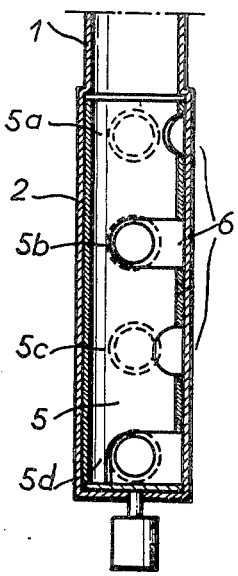

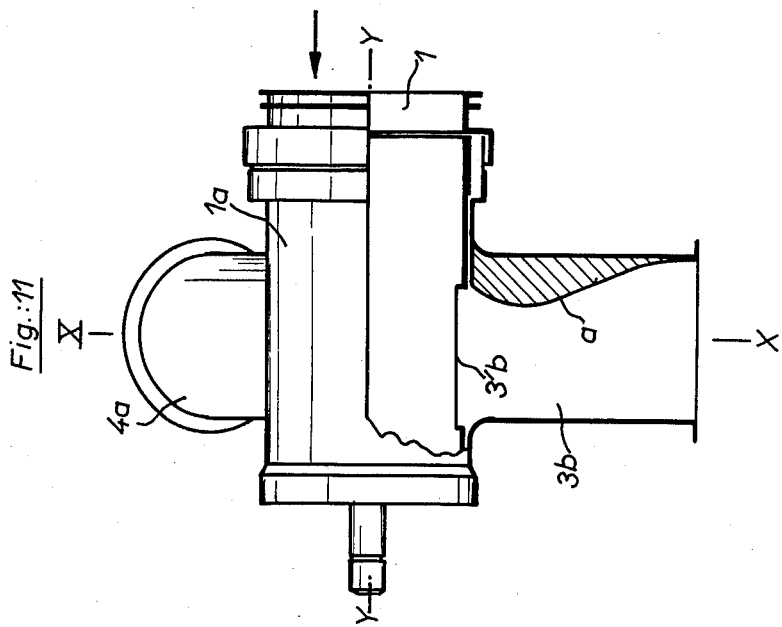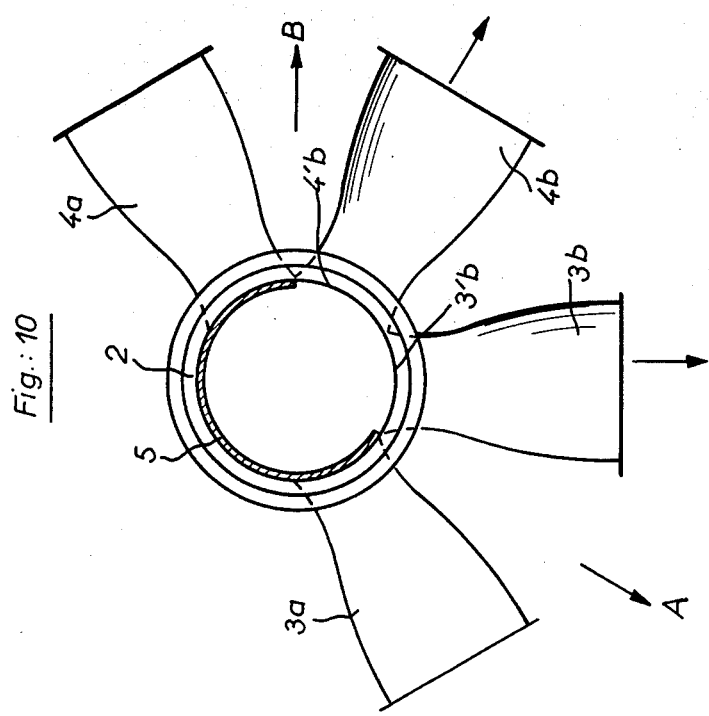

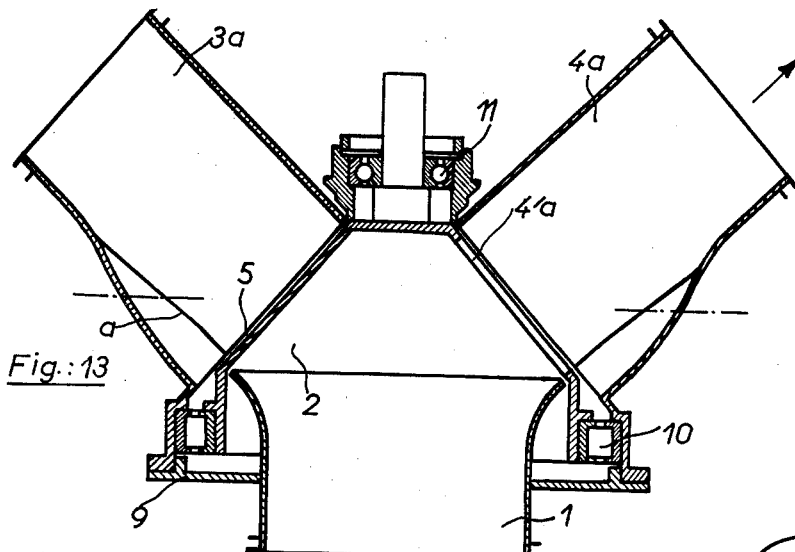
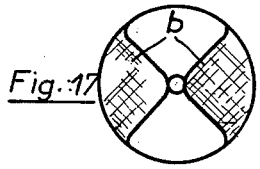
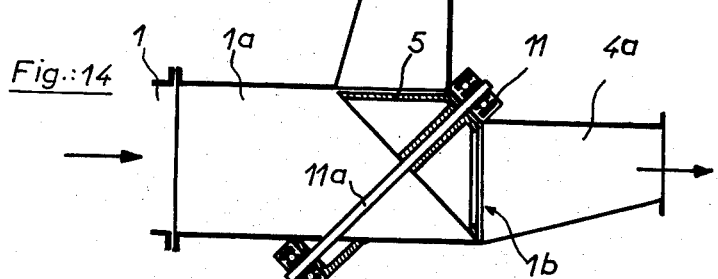
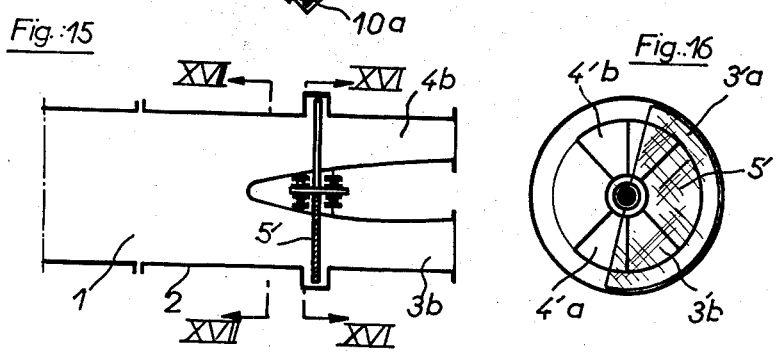
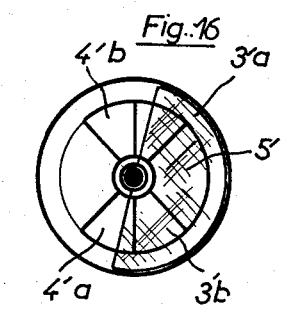

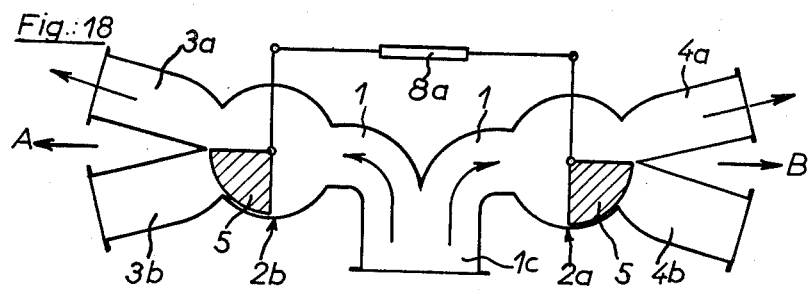
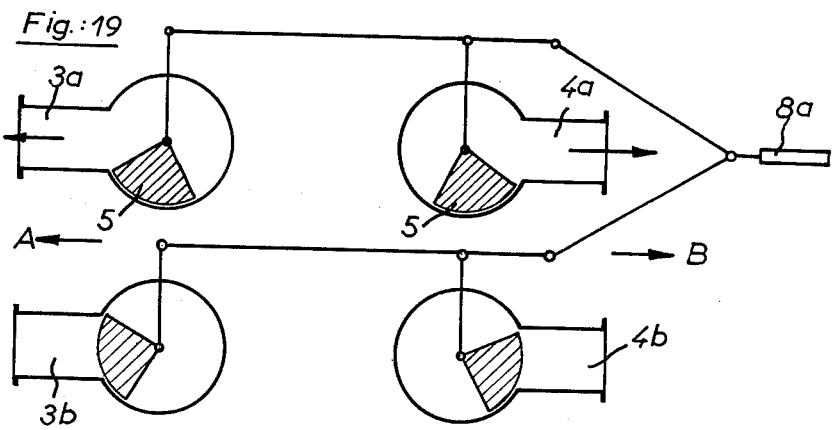
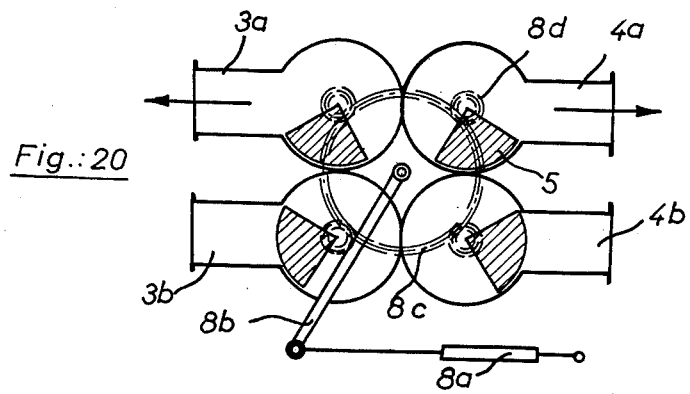

3,190,584
FLUID DISTRIBUTION DEVICE ESPECIALLY
APPLICABLE TO CONTROL BY JET OF
V.T.O.L. AIRCRAFT
Etienne Yves Jean Marie Gire, Fontaine-le-Port, and Auguste Laurent Meunier, L'Hay-les-Roses, France, assignors to Societe Nationale d'Etude et de Construction de Moteurs d'Aviation, Paris, France, a company of France
Filed Apr. 21, 1964, Ser. No. 361,324
Claims priority, application France, Aug. 2, 1962,
Patent 82,162
11 Claims. (Cl. 244—52)

This is a continuation-in-part of applications Ser. No. 185,088 filed April 4, 1962, now abandoned and Ser. No. 298,025 filed July 29, 1963.

The present invention relates to a device for differentially distributing the flow of a source of fluid under pressure.

In the foregoing and in the claims, a differential distribution device means a device which ensures that a reduction in the flow towards one of the points to be supplied causes an increase in the flow towards another point.

One object of the present invention is to provide a fluid distribution device permitting of differential supply to at least two receiving members with the minimum amount of loss caused by cross-sectional restriction in a distribution system, whilst ensuring that a reduction in the flow towards one of the points to be supplied causes an increase in the flow towards another point, the flow delivery from the source thus remaining substantially constant.

A device of the invention comprises a number of receiving members, a plurality of groups each having an equal number of pipes leading respectively to the said receiving members, and differential distributor means having single actuating means, said distributor means being so related to the said groups of pipes that:

(a) In a mean position thereof the distributor means uncover equal passage areas of the pipes leading to the said receiving members, whereby the flow is equally divided therebetween, (b) In an extreme position thereof, the distributor means only uncover the pipes leading to one of the receiving members, while fully obturating the other pipes, whereby only the said receiving member is supplied with the whole flow of the source, (c) In at least one position thereof intermediate the said mean and extreme position, the distributor means uncover unequal passage areas of the pipes leading to the said receiving members, whereby the same are supplied with unequal flows of fluid, (d) In any of the said three positions, at least one pipe is fully uncovered.

The differential distributor means preferably comprise a valve device receiving the delivery from the source and connected to the groups of pipes leading to the receiving members, the valve device having closure means for the various groups of pipes, which are operated synchronously by a common control.

This device is applicable with particular advantage to systems for direction control with the use of jets, and more particularly for producing direction control moments about the longitudinal, lateral and yaw axes of an aircraft adapted to take off vertically without changing trim. By means of such a device, it is possible with a minimum of loss through constriction of cross-section, to divide a constant flow of fluid under pressure taken from the engine between two groups of nozzles arranged on either side of one of these axes. If one considers, for example, the rolling and pitching moments, the nozzles which create these moments can have their discharge directed downwardly, so that the jets which are produced there are used both for providing lift and for direction control.

In a form of embodiment of the invention, the closure means comprise a plurality of obturators which are spaced along the axis of a valve, each obturator co-operating with a group of outlet conduits of the valve, and the obturators being mechanically bound together to be operated simultaneously. For instance, the closure means consist of an elongated hollow rotatable plug member having a peripheral wall which is provided with a plurality of notches arranged in axially spaced transverse planes, each of the said notches co-operating with a group of pipes leading to the respective receiving members, the said plug member being supplied axially with fluid from the source, and the said notches extending over different arcs to perform differential distribution of the fluid between the receiving members with the flow delivery from the source remaining substantially constant and with an amount of losses, caused by cross-sectional restriction of the conduits, which is substantially reduced, as previously stated.

In another form of embodiment, it is possible by means of a single plug, if the cross-sections of the pipes and the angles of displacement of this plug permit, to shorten the length of the valve by arranging the outgoing pipes side by side on the periphery of the said valve in a circle about the axis thereof. These pipes can be arranged for example in a plane perpendicular to the said axis or along the generatrices of a cone co-axial with the valve, this latter arrangement being advantageously combined with a conical plug.

In another form of embodiment it is possible, more specifically in the case of a valve having a very large rate of flow, to reduce or distribute its bulk by making it in several parts which are connected to the common source and each having a closure member and at least one outgoing pipe, the plugs being operated synchronously in order to obtain the flow distribution indicated hereinbefore.

Other features and advantages of the invention will be apparent from the following description with reference to the following drawings, wherein:

FIGURE 1 is a diagrammatic view of one form of embodiment of the invention, taken in section on a plane containing the axes of the various conduits and the axis of the rotary-plug valve;

FIGURE 2 shows two sectional views of the device on the planes IIa—IIa and IIb—IIb respectively of FIGURE 1;

FIGURES 3 and 4 are views similar to FIGURE 2, showing the rotary plug in different positions;

FIGURE 5 is a view similar to FIGURE 1 showing a modification of the valve;

FIGURE 6 shows four sectional views of the valve of FIGURE 5 on the planes VIa—VIa, VIb—VIb, VIc—VIc, and VId—VId, respectively of FIGURE 5;

FIGURE 6a is a view similar to FIGURE 6, showing the rotary plug in a different position;

FIGURE 7 is a section taken through the line VII—VII of FIGURE 5;

FIGURE 8 is a perspective view of the plug of the modified valve of FIGURE 5;

FIGURE 9 is a perspective view of an aircraft on which a jet control device of the invention is shown diagrammatically;

FIGURE 10 is a view of a shortened valve according to another form of embodiment of the invention, taken in section through the line X—X of FIGURE 11;

FIGURE 11 is an elevational view partly in section of the valve shown in FIGURE 10;

FIGURE 12 is a view from below of a valve of reduced length and having a conical plug;

FIGURE 13 is a sectional view taken on the line XIII—XIII of FIGURE 12;

FIGURE 14 shows another form of embodiment, seen in longitudinal sectional view;

FIGURE 15 shows another form of embodiment of a valve of reduced bulk, seen in longitudinal section;

FIGURES 16 and 17 are sectional views respectively on the lines XVI—XVI and XVII—XVII of FIGURE 15;

FIGURES 18, 19 and 20 are diagrammatic views of various forms of embodiment of multiple valves, and FIGURE 21 is a diagrammatic perspective view of one of the valves of FIGURE 18.

In the various figures, the elements or members which carry out like functions are designated by like reference numerals.

In the device shown in FIGURES 1 to 4, a conduit 1 connected to a source of fluid under pressure terminates at one of the ends of a cylindrical valve body or casing 2 whose axis coincides with the axis of the conduit 1. Branching from this casing are two groups of conduits, 3a, 4a and 3b, 4b, extending radially in two different transverse planes, which have such cross-section that when, for example, the conduits 4a, 4b are in communication with the conduit 1 whereas the conduits 3a, 3b are obturated (FIGURE 3), the conduits 4a, 4b which are in service can convey the entire flow delivered through the conduit 1.

The conduits 3a, 3b lead to one point A of two points to be supplied and the conduits 4a, 4b similarly supply the other point B, each of the points to be supplied being thus connected to the casing 2 by two conduits in parallel.

Rotatable in the casing 2 is a hollow cylindrical plug 5 which is freely open towards the conduit 1 and which is apertured parallel to its generatrices in such a manner that its wall is composed of ring segments 5a, 5b defined by two notches 6a, 6b which extend over different arcs in the transverse planes of the groups of conduits 3a, 4a and 3b, 4b respectively, as FIGURE 2 shows more particularly. At its end opposite from the conduit 1, the plug comprises an end part 7 fast with a pin 7a which can be rotated in either direction by a driving device 8.

When the rates of flow to be supplied to the points A and B are equal, the rotary plug of the valve occupies the position shown in FIGURE 2. The points A and B receive equal amounts of flow without cross-sectional constriction.

When the flow towards one of the points, the point A for example, is to be nil, the rotary plug of the valve has rotated through a certain angle and takes up the position shown in FIGURE 3. The entire flow from the source passes without any cross-sectional constriction towards the point B through the two ducts 4a and 4b.

When there is to be a greater rate of flow towards one of the points, B for example, than the flow rate towards the other point, the rotary plug occupies an intermediate position as shown in FIGURE 4. The flow going towards the point B will proceed for the greater part without cross-sectional constriction, only a part of the total flow being subjected to such constriction.

It will thus be seen that the device described makes it possible to distribute the delivery from the source towards various points to be supplied in such a manner that the reduction in the delivery towards one point is accompanied by an increase in the delivery towards another point, whilst ensuring that the supply of the various points is effected without loss of energy in the central position and the end positions of the valve, and that there is loss only in the intermediate positions, this loss, however, affecting only a part of the flow, which would not be the case if the points were supplied each one by a single conduit.

In order to reduce the losses in the total flow in the intermediate positions, it is possible to increase the number of conduits connecting the valve to each of the said points.

FIGURES 5 to 8 show a modification wherein the valve is connected by four conduits (3a, 3b, 3c, 3d and 4a, 4b, 4c, 4d) to each of the points to be supplied A and B, the rotary plug of the valve being illustrated in FIGURES 5 and 6 in the central position corresponding to equal flows towards the two points.

The modified valve of FIGS. 5 to 8 comprises an elongated casing or body 2 and a hollow cylindrical plug 5 rotatable in the body, which has a peripheral wall provided with four notches 6a, 6b, 6c, 6d defining four ring segments 5a, 5b, 5c, 5d extending over different arcs. The general arrangement of the valve is the same as in FIGURE 1, the modification being that four groups of outgoing pipes 3a–4a, 3b–4b, 3c–4c and 3d–4d are provided between the valve and the points A and B to feed the receiving members which are located at the said points, respectively.

In the mean position shown in FIG. 6, four outlet pipes 3b, 4b, 3d, 4d are fully uncovered. It will be apparent that in two extreme positions (not shown), four outlet pipes 3a, 3b, 3c, 3d, or 4a, 4b, 4c, 4d, respectively, will be fully uncovered, while in an intermediate position shown in FIGURE 6a, four outlet pipes 4b, 4c, 4d, 3d are fully uncovered. It thus may be appreciated that four pipes are fully uncovered in each of the mean, extreme and intermediate positions. Thus, the flow of fluid supplied by the source is conveyed through the full passage area of same number of pipes, which is equal to the number of groups, in each of three said positions, without loss of energy due to any cross-sectional restriction of the passage area by the plug member 5.

The invention can be applied to any differential control system using the energy of a fluid, more particularly in jet control systems for vertical take-off aircraft. In this case, the energy of the fluid can be used for producing a lift force, the variations in the rate of flow at each side of the valve making it possible to obtain control moments about one of the axes of the aircraft.

In the control device illustrated in FIGURE 9, the chamber 12 is supplied with compressed air taken from the jet engines (not shown) of the aircraft. This chamber supplies with compressed air the three valves 13, 14 and 15 which are controlled respectively by jacks 13', 14' and 15'. Each of these valves is of the type previously described with reference to FIGURES 1 to 4.

Associated with the valve 13 are on the one hand the conduits 23 and 33 respectively terminating at the pitching nozzles 23' and 33', and on the other hand the conduits 43 and 53 terminating respectively at the pitching nozzles 43' and 53'. These pitching nozzles 23', 33', 43' and 53' discharge in the downward direction; the pitching moments necessary for direction control are obtained by using the valve 13, controlled by the jack 13', to vary the proportion of the total flow sent to the forward nozzles 23', 33' and to the rear nozzles 43', 53'. The valve 13 being of the type previously described with reference to FIGURES 1 to 4, it operates with a constant rate of flow; since it causes a minimum of loss by cross-sectional constriction, the flow is used with good efficiency in the nozzles 23', 33', 43' and 53' in order create thrusts which serve both for direction control and for providing lift.

What has just been said regarding the pitching valve 13 is equally valid for the rolling valve 14, with which are associated the conduits 24, 34, 44 and 54 terminating respectively at the rolling nozzles 24', 34', 44' and 54' which discharge downwardly. Also associated with the yaw valve 15 are the conduits 25, 35, 45 and 55 which terminate respectively at the yaw nozzles 25', 35', 45' and 55'; the discharge from these nozzles goes towards the right and consequently they do not create any lifting thrust; apart from this, what was said regarding the valves 13 and 14 is also valid here.

In the device which has just been described with reference to FIGURE 9, the valve 13 is therefore used for creating moments about the lateral axis, the valve 14 moments about the longitudinal axis, and the valve 15 moments about the yaw axis. Since there is a constant rate of flow at these valves, they do not modify the percentage of the flow taken from the jet engine.

Since they use the minimum of cross-sectional constriction for regulating the direction control moments, the flow used can obtain lifting forces with good efficiency.

Relatively to other systems which might have these properties, this system has the following advantages:

The valves can be placed at the centre of the aircraft, which is easier than at the end of the wing or at the top of the fuselage, Each axis controlled requires only one valve, which simplifies their control. For example, in FIGURE 9, a jack such as 13' acts directly on the valve such as 13 without any intermediate elements, The discharge nozzles have a fixed cross-section and can thus be defined so as to have the best efficiency, The fact that there are a plurality of parallel conduits instead of a single larger conduit is not a disadvantage, since it is easier to accommodate them in an aircraft, more particularly in a wing of slight thickness.

Referring now to FIGURES 10 and 11, the valve shown thereon comprises an axial inlet 1 and four ports such as 3'b and 4'b which are arranged in a circle along the periphery of the valve body 2 and to which are fitted four outgoing conduits 3a, 3b, 4a, 4b terminating in pairs at the points of use A and B as shown. A plug 5 can rotate in the valve body, obturating or unmasking the four ports.

In the mean position illustrated in FIGURE 10, the points A and B receive an equal flow of fluid through the conduits 3b and 4b, the conduits 3a and 4a being closed. A suitable rotational movement of the plug 5 from this position in one or other direction permits of supplying a single side with the entire available flow. For example, if the plug 5 is rotated through a suitable angle in the clockwise direction, the conduits 4a and 4b are closed in an extreme position and all the flow flows towards the point A through the conduits 3a and 3b. In intermediate positions, the conduit 3b is fully uncovered and conduits 3a and 4b are partly uncovered, so that the points A and B are fed unequally.

Each of the conduits 3a, 3b, 4a, 4b can be provided with an internal wall a defining a throat whose cross-section varies with the position of the plug 5.

In the valve shown in FIGURES 10 and 11, the valve body and the plug 5 are cylindrical and the outgoing conduits have their axes in one and the same plane perpendicular to the axis Y—Y of the valve. In the valves of this kind, it is also possible to incline the outgoing conduits relatively to the longitudinal axis, for the sale purpose of reducing the change in direction of the flow within the valve. But in this arrangement the cross-sections unmasked by the plug are no longer perpendicular to the mean direction of the flow, with the result that the variations in cross-section produced by the plug in the ports such as 3'b or in the throat defined by the walls a remain badly defined.

In order to overcome this disadvantage, it is possible to use a conical-plug valve such as that illustrated for example in FIGURES 12 and 13. FIGURE 12 is a view of the valve from below, the inlet 1 and the lower cover 9 being assumed to have been removed. FIGURE 13 is a sectional view on the cylindrical surface having as its directrix the axis XIII—XIII of the two conduits 3b, 4a, this sectional view being brought by rotation into the frontal plane of symmetry for the purpose of projection. In this arrangement, the valve body 2 and the plug 5 have peripheral walls which are frusto-conical and the outgoing conduits 3a, 3b, 4a, 4b have their inlet portions substantially normal to the peripheral wall of the body 2, so that the conduits are connected thereto substantially along cross-sections of the conduits, if necessary by means of internal walls a. The result is thus obtained that the cross-section of passage unmasked by the plug is perpendicular to the mean direction of flow. It will be seen in FIGURE 12 that the outgoing ports or orifices such as 4'a are not circular but of trapezoidal form and are connected further downstream to conduits such as 4a, having a circular cross-section.

The blind portion of the plug 5 is shown in FIGURE 12 and permits distribution without valve losses, as in the position shown in FIGURE 10. In the position shown in the drawings, the ports 3'a and 4'a are uncovered. By rotating the plug in the appropriate direction, the ports 4'a and 4'b, then 3'b and 4'b, and finally 3'a and 3'b, are uncovered successively.

The plug 5 can be rotatably mounted by means of an antifriction bearing with peripheral rollers 10 an antifriction- or ball-bearing 11 about the central stem.

In conical plug valves having axial inlets, if it is not desired to make the plug operate in an overhung or cantilever manner, it is necessary to have a bearing at the from or smaller base of the plug and a bearing at the rear or larger base thereof. In the arrangement shown in FIGURE 13, the rear bearing is constituted by the antifriction bearing 10 surrounding the inlet orifice of the valve externally. But if the diameter at the base of the plug is considerable (valve having a considerable through flow) this mechanical solution becomes heavy and expensive. It would then be possible to use a valve having an internal rear central bearing, but this solution would have the disadvantage of hindering the through flow.

In order to overcome this disadvantage, it is possible to use a valve arranged as shown in FIGURE 14. In this form of embodiment, the valve comprises a rear central bearing 10a situated outside the flow and externally of the conduits. The four outgoing conduits such as 3a and 4a, and also the plug 5 and its front bearing 11 can be arranged as shown in FIGURE 13. The inlet conduit 1 is no longer axial but is connected to a rear body portion 1a of the valve, which is suitably inclined on a frusto-conical body portion 1b in such a manner that the operating spindle 11a of the plug can extend through the rear body portion 1a and the bearing 10a can thus be positioned externally.

Independently of questions of flow, this solution also affords the advantage that the two bearings of the valve are not in the flow (advantageous in the case of hot or corrosive fluids, facilitating maintenance and lubrication of the bearings).

The form of embodiment of FIGURES 15, 16 and 17 differs from the preceding in that the closure member 5' is no longer a cylindrical or conical plug but is in the form of a sector of a circular disc. The four outgoing pipes 3a, 3b, 4a, 4b are in prolongation of the axial inlet 1 and are connected to a valve body 2 by four ports 3'a, 3'b, 4'a, 4'b in the form of sectors arranged in a circle around the axis of the valve body 2, in a plane perpendicular to the axis thereof. The closure member 5' which in the example illustrated is substantially semi-circular, rotates in the said plane coaxially to the body successively obturating in its rotational movement the pipes 3a and 3b and then 3b and 4a, 4a and 4b and finally 4b and 3a, thus permitting of differential supply to the two points of use as in the preceding examples.

It will be seen that in this form of embodiment the outgoing pipes are in prolongation of the inlet 1 and that consequently the valve does not change the direction of flow of the fluid but requires a considerable frontal inlet cross-section. The outgoing pipes 3a, 3b, 4a, 4b have originally the form of sectors (FIGURE 16) and are connected downstream to circular conduits. Upstream of the closure member there are provided deflectors b (FIGURE 17) avoiding the discontinuity of the cross-sections of passage of the valve and permitting progressive transformation from the circular section of the inlet 1 to the sector-shaped section opposite the closure member 5'.

When the need is for valves with a very large through flow rate, it may be advantageous, for reasons of accommodation, to make these valves in several parts. FIGURES 18 to 21 illustrate diagrammatically the various forms of embodiment of such valves.

In the form of embodiment shown in FIGURE 18, the outgoing pipes 3a, 3b and 4a, 4b are grouped in pairs on two valve elements 2a and 2b whose inlets 1 are connected to the source (not shown) by a common conduit 1c. The plug 5 of each valve element closes selectively the two outgoing pipes connected to this element. A jack 8a operates the two plugs at the same time so as to ensure the distribution of flows as in the case of the preceding figures.

FIGURE 21 shows a form of embodiment of the valve 2a in which inflow is effected laterally, but it will be apparent that in the arrangement illustrated diagrammatically in FIGURE 18, inflow could equally well be axially as in the case of FIGURE 10. The commencement of conduits at the valves is of rectangular cross-section; these conduits can be connected further downstream to a circular cross-section as shown in FIGURE 21.

In the arrangement shown diagrammatically in FIGURE 19, each of the outgoing pipes 3a, 3b, 4a, 4b is associated with a constituent valve comprising an axial inlet and can be closed or opened by a plug 5. The four plugs are operated simultaneously by a jack 8a so as to obtain the distribution of fluid already described. These four constituent valves can be distributed in different places.

In the arrangement shown in FIGURE 20 the four valves are grouped together and their plugs are controlled simultaneously by a jack 8a by means of a crank 8b which is fast with a gear wheel 8c meshing in four gearwheels such as 8d which are fixed to the shafts of the plugs. This arrangement makes it possible to orientate the outgoing conduits as desired.

What is claimed is:

1. A device for differentially distributing the flow of a source of fluid under pressure, comprising a number of receiving members, a plurality of groups each having an equal number of pipes leading respectively to the said receiving members, differential distributor means, and single actuating means for said distributor means, said differential distributor means being so related to the said groups of pipes that:
   (a) in a mean position thereof the distributor means uncover equal passage areas of the pipes leading to the said receiving members, whereby the flow is equally divided therebetween,
   (b) in an extreme position thereof, the distributor means only uncover the pipes leading to one of the receiving members, while fully obturating the other pipes, whereby only the said receiving member is supplied with the whole flow of the source,
   (c) in at least one position thereof intermediate the said mean and extreme positions, the distributor means uncover unequal passage areas of the pipes leading to the said receiving members, whereby the same are supplied with unequal flows of fluid,
   (d) in any of the said three positions, at least one pipe is fully uncovered.

2. A device as claimed in claim 1, wherein the distributor means fully uncover a number of pipes, which is equal to the number of groups, in any of the said three positions.

3. A device as claimed in claim 1, wherein the distributor means comprise a valve device having closure means adapted to obturate and uncover the pipes of each group, means for mutually associating all the closure means, and means for simultaneously positioning said associated closure means anywhere between the said three positions.

4. A device as claimed in claim 3, wherein the valve device comprises a body having an axis of revolution, an axial inlet orifice connected to the source, and a plurality of groups of outlet pipes arranged radially on the body, the pipes of each group being located in a transverse plane spaced apart from transverse planes wherein other groups of pipes are located; and the closure means comprise an elongated hollow plug rotating in the body about the axis, which has an axial inlet opening in register with the inlet orifice, and a peripheral wall provided with a plurality of outlet notches co-operating with the groups of pipes, respectively, and extending in the various transverse planes thereof over different arcs arranged in such a way that at least one of the outlet pipes is uncovered in any of the mean, extreme and intermediate positions.

5. A device as claimed in claim 3, wherein the valve device comprises a body having an axis of revolution, an axial inlet orifice connected to the source and a plurality of outlet pipes arranged in a circle along the periphery of the body; and the closure means consist of a single plug rotating in the body about the axis.

6. A device as claimed in claim 5, wherein the valve body and plug have frusto-conical peripheral walls, the inlet orifice is provided in the larger base of the frusto-conical body, and the outlet pipes have their axis normal to the said frusto-conical peripheral walls.

7. A device as claimed in claim 6, comprising first and second bearings for supporting the frusto-conical plug at the smaller and larger bases thereof, respectively, the second bearing being arranged around the inlet orifice.

8. A device as claimed in claim 3, wherein the valve device comprises a frusto-conical body portion having a plurality of pipes arranged in a circle along the periphery thereof, and a rear body portion connected to the larger base of the frusto-conical body portion and inclined at an angle to the axis thereof, the rear body portion having an inlet orifice connected to the source; and the closure means consist of a frusto-conical plug rotating in the said frusto-conical body portion, which has an operating spindle extending through the rear body portion and supported externally thereof.

9. A device as claimed in claim 3, wherein the valve device comprises a body having an axial inlet orifice connected to the source, a plurality of outlet ports arranged in a circle around the axis of the body, in a plane perpendicular to the said axis, and a plurality of axially extending outlet pipes connected to respective ports; and the closure means comprise a sector of a circular disc rotating in the said plane coaxially to the body.

10. A device as claimed in claim 3, wherein the valve device comprises several elemental valves connected to the source, each elemental valve having at least one outlet pipe and an obturator member.

11. A device as claimed in claim 1, for use on an aircraft to obtain a control moment by jet about one of the roll, pitch and yaw axes of the aircraft, wherein each of a pair of receiving members arranged symmetrically to said axis consists of an assembly of at least two discharge-nozzles orientated in parallel, and each group of pipes comprises two pipes leading respectively to two discharge-nozzles of two different assemblies.

References Cited by the Examiner

UNITED STATES PATENTS 2,870,978   1/59   Griffith _____ 244—52 XR

FOREIGN PATENTS 610,143   10/48   Great Britain.

M. CARY NELSON, *Primary Examiner.*

MARTIN P. SCHWADRON, *Examiner.*